(No Model.)
J. HUNTER.
CURRYCOMB.
No. 488,923. Patented Dec. 27, 1892.
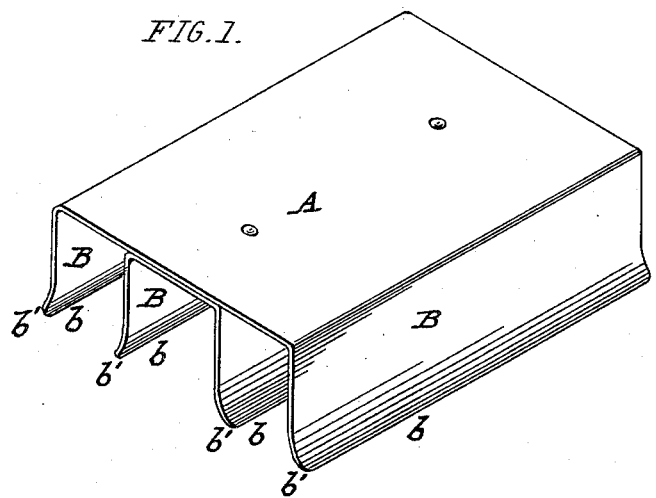
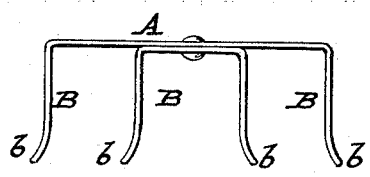
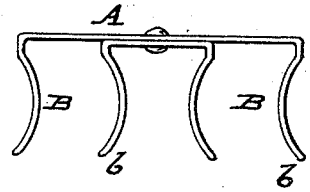
ATTEST:
Geo H Arthur
M. H. Holmes
INVENTOR:
Joseph Hunter.
by Robert Burns
Attorney.

UNITED STATES PATENT OFFICE.

JOSEPH HUNTER, OF CHICAGO, ILLINOIS, ASSIGNOR, BY MESNE ASSIGNMENTS, TO WILBER F. MEADER AND JENNIE E. PHILLIPS, OF SAME PLACE, AND ADOLPH POWELL AND MAX SAHLIN.

CURRYCOMB.

SPECIFICATION forming part of Letters Patent No. 488,923, dated December 27, 1892.

Application filed January 31, 1890. Serial No. 338,779. (No model.)

*To all whom it may concern:*

Be it known that I, JOSEPH HUNTER, a citizen of the United States, residing at Chicago, in the county of Cook and State of Illinois, have invented a certain Improvement in Currycombs, of which the following is a specification.

In curry combs as heretofore constructed, the blades thereof have been of a serrated or toothed form, as a consequence thereof their action upon tender portions of an animal's hide, has been of an irritating nature, necessitating both care and time in effecting a thorough currying of the animal.

By long and careful experiment, I have found that the currying of a horse can be effected in a much quicker time and without irritation of the animal, by means of a currycomb the blades of which have unbroken edges, and corners made rounding, the best results being attained with such blades, set in an oblique direction to the body or base of the appliance, with an appliance so constructed the currying action is both pleasant and soothing to the animal, so much so that a thorough currying of a sensitive animal can be effected in one half the time required with the ordinary comb.

In the accompanying drawings showing the preferred manner of constructing my improved curry comb:

Figure 1 is a perspective view of my improved curry comb; Figs. 2 and 3 transverse sections of the same showing slightly modified forms of the currying blades.

Similar letters of reference indicate like parts in the different views.

As shown in the drawings the curry comb consists of plates of metal bent into a channeled or trough shape so as to form the back A and the blades B of the curry comb, there being two of such plates the backs of which are secured together by rivets as clearly indicated in the drawings. If desired three or more of such plates may be used without departing from the spirit of this part of my invention. The blades B are curved in a longitudinal direction and outwardly from the middle of the comb so as to present salient edges $b$ the corners $b'$ of which are rounded as shown and such curves may be made in the entire body of the blades as indicated in Fig. 3 or at the edges of the blades as indicated in Fig. 2. The edges of the blades are plain and unnotched the salient form imparted thereto being found to afford ample scruffing action upon the hide of the animal and at the same time sets up a circulation of air that carries off the dust and causes a soothing and cooling effect upon the animal during the carrying operation.

I am aware that prior to my invention curry combs, have been constructed with blades having serrated edges, and arranged in an oblique direction to the back or base of the comb. I am also aware, that a single bladed scraper has heretofore been formed with round corners, as well as a circular rimmed comb, with plain inserted blades. I therefore make no claim to any such construction broadly, but

Having thus fully described my said invention, what I claim as new and desire to secure by Letters Patent is:

1. A curry comb comprising a back A, and a series of parallel blades B, the edges of which are made plain and unnotched, and having rounded corners, and disconnected ends, so as to form open ended longitudinal channels, through which the dust &c., is carried out by the currents of air generated by the use of the comb, essentially as set forth.

2. A curry comb comprising a back A, and a series of parallel blades B, the edges of which are made plain and unnotched, and having rounded corners and disconnected ends, so as to form open ended longitudinal channels through which the dust, &c., is carried out by the currents of air generated by the use of the comb, the edges of said blades being made to project obliquely in opposite directions from the center or middle of the comb, essentially as set forth.

In testimony whereof witness my hand this 16th day of January, 1890.

JOSEPH HUNTER.

In presence of—
ROBERT BURNS,
GEO. H. ARTHUR.